July 2, 1935.  C. S. HAZARD ET AL  2,006,948
WATER HEATING SYSTEM
Filed Dec. 30, 1933
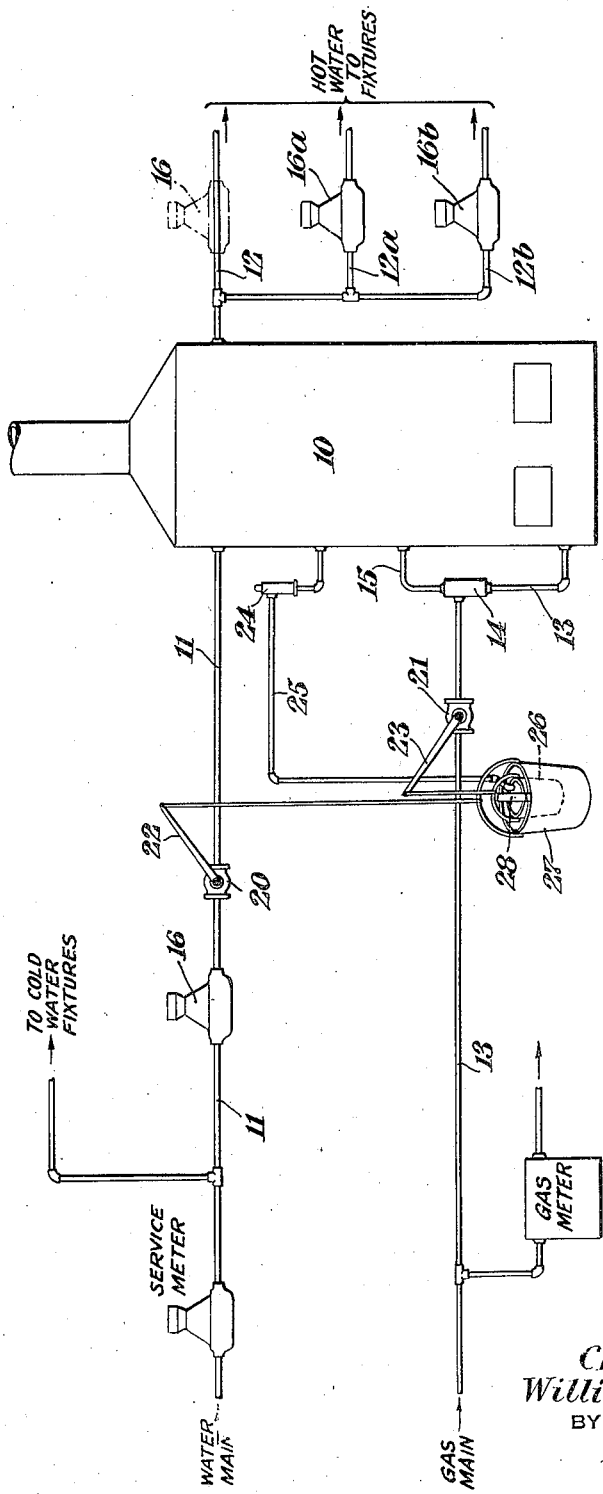
INVENTORS
*Charles S. Hazard*
*William H. McGarry*
BY
ATTORNEYS Patented July 2, 1935

2,006,948

UNITED STATES PATENT OFFICE 2,006,948

WATER HEATING SYSTEM

Charles S. Hazard, Flushing, N. Y., and William H. McGarry, Medford, Mass., assignors to Neptune Meter Company, a corporation of New Jersey Application December 30, 1933, Serial No. 704,804

13 Claims. (Cl. 122—4)

This invention relates to automatic water heating systems and particularly to metering means for measuring the energy consumed in heating the water used and also to control means associated therewith.

Where automatic heaters are employed for furnishing hot water for domestic use householders sometimes object to the cost of electricity or gas consumed by the heater as disproportionate to the quantity of hot water which they use. Inasmuch as a considerable part of the energy consumed by such heaters is utilized in maintaining the water at a determined temperature at times when hot water is not being used, during the night, or when the occupants are away from home, there is some merit in these objections.

The present invention contemplates measuring the amount of gas or electricity utilized in heating to service temperature the water actually used and charging the householder for this amount, rather than the full quantity of gas or electricity consumed, in order to overcome these objections.

However, the usual type of gas or electric meter registers the total energy consumed and even though a separate gas or electric meter were provided for the heater it would be incapable of distinguishing between the energy consumed for heating the water actually used and the total energy consumed by the heater. Therefore, one object of the present invention is to provide metering means adapted to register only the quantity of energy consumed in heating water to the service temperature.

In many communities safety regulations require that automatic water heaters be provided with relief valves operating under emergency pressure or temperature conditions in the heater to reduce the possibility of accidents occurring. The provision of such relief valves may result, in some cases, in considerable wastage of water and heating energy and, accordingly, another object of the invention is to provide control means operating to shut off the supply of water and heating energy upon operation of a relief valve in order to prevent excessive energy charges being registered against the householder under such conditions.

The accompanying drawing illustrates in diagrammatic form an automatic water heating system embodying the invention.

The invention will be described as embodied in a water heating system in which gas is used as the heating medium. However, it is to be understood that the invention may also be employed in systems utilizing electricity. In the drawing, the numeral 10 designates a water heater connected to a cold water line 11 led from a suitable source of supply and having a service line 12 for withdrawing water from the heater and delivering it to the various service fixtures. A pipe 13 connected to the gas main and to the burners of the heater 10 supplies energy for heating the water. A valve 14 in pipe 13 controlled by a thermostatic member 15 responsive to the temperature of water in heater 10 is provided for cutting off the supply of gas when the temperature of the water has been raised to a predetermined point, 140° for example, and for admitting additional gas when the temperature falls below said point.

No metering device is provided in pipe 13 connecting heater 10 to the gas main since it is not desired to charge the customer for all the gas consumed in heating water to a determined temperature and maintaining it at said temperature during times when hot water is not being used. However, in order that the customer may be charged for the energy consumed in heating the hot water which he actually uses from the temperature at which it enters the heater to the delivery temperature, a metering device 16 is provided in the cold water supply line 11.

Since meter 16 measures the quantities of water flowing therethrough to replace the hot water used, its readings are in direct proportion to the energy consumed in heating this water. Hence, utility companies may base their charges for energy consumed in heating water on the number of gallons of hot water actually consumed rather than on the total number of cubic feet of gas, or kilowatts of electricity, supplied for heating water and maintaining it at service temperature.

Inasmuch as the average temperature of water entering the heater and the B. t. u.'s in the gas consumed for raising its temperature to the delivery point determined by thermostatic device 14, 15 are readily ascertainable, the registering mechanism of meter 16 may, if desired, be calibrated to indicate the quantities of gas thus consumed. Thermostatic device 14, 15 assures that the readings of meter 16 correspond to the quantity of gas chargeable against the householder since it cuts off the gas when a supply of water has been heated to the predetermined temperature on which the calibrations of the meter are based.

Although valve 14 may be frequently operated to maintain the water at predetermined temperature, the cost of gas consumed in this way is not chargeable against the householder but is absorbed by the gas company which may levy a nominal minimum service charge to recoup a part of this cost as well as that of the gas consumption due to radiation from the heater.

At the right of the drawing an alternative location in delivery line 12 is indicated for meter 16 and the characters 12ª and 12ᵇ designate other delivery lines having meters 16ª, 16ᵇ therein so that the proper charges for energy utilized in heating the water used by various occupants of a multi-family building may be allocated among them.

Where a relief valve is provided for permitting discharge of water from the heater if emergency conditions occur, the supply of gas and feed water should be automatically shut off to prevent wastage and a possibly large increase in the energy charge against the householder. As shown in the drawing valves 20 and 21, for example of the swinging gate type, having operating levers 22, 23 are provided in the water feed line 11 and the gas supply pipe 13. A normally closed relief valve 24, of any preferred form of construction adapted to be opened if and when the pressure and/or temperature conditions in the heater 10 reach the danger point, is provided in the discharge line 25. According to the present invention discharge line 25 is connected to the heater at a point sufficiently below the top thereof so that only water is discharged from the heater on opening of valve 24. Discharge line 25 empties into a bucket 26 or other vessel freely suspended from the lever 23 of valve 21. A second bucket 27 which is concentric with bucket 26 and adapted to receive any overflow therefrom, is similarly suspended from the operating lever 22 for valve 20.

The bucket and lever systems are adjusted so that the valves 20, 21, which are normally open, are not affected by the mere weight of their related buckets. Valve 21 is closed when water discharges from heater 10 in sufficient quantity to cause bucket 26 to descend and operate lever 23, and valve 20 is closed as water overflowing from bucket 26 causes bucket 27 to descend and operate lever 22. A cross bar 28 secured to bucket 27 extending across and engaged by the top of bucket 26 serves to support bucket 27 from lever 23 also and acts to hold bucket 27 against descent for shutting off the water unless bucket 26 has acted to shut off the gas supply.

It will be seen that with the above described arrangement the discharge of a certain quantity of water, sufficient to cause bucket 26 to descend and close valve 21, results in the gas being shut off to prevent waste thereof. If the discharge should continue after the gas has been shut off, valve 20 is closed by the descent of bucket 27 thus discontinuing the flow of water through meter 16 so that it may not be operated to improperly register gas consumption when the supply thereof has been cut off. The closing of valve 20 also eliminates wastage of water by preventing water entering the heater only to be discharged through the operation of the relief valve.

Upon consideration it will be noted that the mechanisms for actuating the valves 20 and 21 function, in effect, as measuring devices for operating these valves, in that when relief valve 24 discharges a predetermined quantity of water (i. e. sufficient to cause bucket 26 to descend and operate lever 23) valve 21 is closed and upon discharge of a determined additional quantity, (i. e. sufficient to overflow bucket 26 and cause bucket 27 to descend) valve 20 is closed. The bucket arrangement shown is merely illustrative and may be replaced by other measuring devices; such, for example, as a meter in line 25, similar to meter 16 but provided with mechanisms operating when predetermined quantities of water are discharged therethrough to control suitable electrical or mechanical devices for actuating valves 20 and 21.

As stated above the invention is readily adaptable to water heating systems utilizing electricity, valves 14 and 21 being replaced by switches and other electrical devices being substituted where required.

Many variations and changes may be made without departing from the spirit of the invention and therefore it is desired to include all such changes and variations within the scope of the appended claims.

We claim:—

1. In combination with a water heater; a water distributing system comprising a cold water supply line connected to said heater and a delivery line for withdrawing heated water therefrom for consumption; a source of heating energy; a meterless connection between said source and said heater for supplying energy thereto; thermostatic means associated with said heater and said energy connection operative to cause water supplied to said heater to be heated to a determined temperature; and means associated with said water distributing system for metering the energy consumed in heating to said determined temperature the water which is withdrawn from said heater for consumption.

2. In combination with a water heater; a water distributing system including a cold water supply line connected to said heater and a delivery line for withdrawing heated water therefrom; a source of heating energy; a meterless connection between said source and said heater for supplying energy thereto; means for measuring the energy consumed in heating water withdrawn from said heater for consumption comprising thermostatic means associated with said heater and said energy connection operative to cause water supplied to said heater to be heated to a determined temperature, and means in said water supply line for metering the quantity of water heated to said temperature.

3. In a water heating system having a heater, a water feed line, a heating energy line, and a discharge line, all connected to said heater; a normally closed relief valve for said heater controlling said discharge line and operative to permit discharge of water under emergency conditions; and means associated with said discharge line controlling said feed water and energy lines and operable on discharge of water from said heater to shut off the supply of water and heating energy thereto.

4. In a water heating system having a heater, a water feed line, a heating energy line, and a discharge line, all connected to said heater; a normally closed relief valve for said heater controlling said discharge line and operative to permit discharge of water under emergency conditions; means associated with said discharge line for measuring the quantity of water discharged on opening of said relief valve; and means controlled by said measuring means and operable on discharge of a predetermined quantity of water for discontinuing the supply of heating energy to said heater.

5. In a water heating system having a heater, a water feed line, a heating energy line, and a discharge line, all connected to said heater; a normally closed relief valve for said heater controlling said discharge line and operative to permit discharge of water under emergency conditions; means associated with said discharge line for measuring the quantity of water discharged on opening of said relief valve; and means controlling said feed water line and operable by said measuring means on discharge of a determined quantity of water for shutting off the supply of feed water to said heater.

6. In a water heating system having a heater, a water feed line, a heating energy line, and a discharge line, all connected to said heater; a normally closed relief valve for said heater controlling said discharge line and operative to permit discharge of water under emergency conditions; means associated with said discharge line for measuring the quantity of water discharged on opening of said relief valve; means controlled by said measuring means operative on discharge of a predetermined quantity of water for discontinuing the supply of heating energy to said heater; and means controlled by said measuring means and operative on discharge of water in excess of said predetermined quantity to shut off the supply of feed water to said heater.

7. In a water heating system having a heater, a water feed line, a heating energy line, and a discharge line, all connected to said heater; a normally closed relief valve for said heater controlling said discharge line and operative to permit discharge of water under emergency conditions; means associated with said discharge line controlling said feed water and energy lines and operable on discharge of water from said heater to shut off the supply of water and heating energy thereto; and interlocking means associated with said supply control means acting to prevent shutting off of said water supply while heating energy is supplied to said heater.

8. In a water heating system; a heater; a feed water line, a heating energy line and a discharge line, all connected to said heater; metering means in said feed water line for registering the energy consumed in heating the water supplied to said heater; a normally closed relief valve for said heater controlling said discharge line to discharge water from said heater under emergency conditions; control means in said energy line; means responsive to the discharge of water from said heater through said discharge line for operating said energy control means to shut off the supply of energy; a valve in said water feed line; and means operable on operation of said energy control means in response to discharge of water from said heater through said discharge line for closing said water valve to shut off the flow of feed water through said metering means.

9. In a water heating system; a heater; a water feed line connected to said heater; a heating energy feed line connected to said heater; a relief valve for said heater operative to discharge water therefrom under emergency conditions; control means in one of said feed lines; means for operating said control means to cut off the supply through said line to said heater; and a vessel connected to said control operating means and positioned to receive the water discharged for actuation thereby to operate said means for actuating said control means.

10. In a water heating system; a heater; a water supply line connected to said heater; a heating energy supply line connected to said heater; a relief valve for said heater operative to discharge water therefrom under emergency conditions; control means in said water and energy supply lines, respectively; individual means for operating the respective control means; a vessel connected to the operating means for said energy control means positioned to receive the water discharged from said heater and acting on discharge of a determined quantity of water to operate said energy control means to cut off the supply of energy; a second vessel connected to the operating means for said water supply control means positioned to receive the overflow from said first mentioned vessel and operable by said overflow for actuating said water supply control means to shut off the supply of water to said heater.

11. In a water heating system; a heater; a water feed line connected to said heater; a heating energy feed line connected to said heater; a relief valve for said heater operative to discharge water therefrom under emergency conditions; a normally open valve in one of said lines; an operating lever for said valve; and a vessel suspended from said lever and positioned to receive water discharged on opening of said relief valve for actuating said lever to close said valve.

12. In a water heating system; a heater; water feed and heating energy lines connected to said heater; a relief valve for said heater operative to discharge water therefrom under emergency conditions; normally open valves in said water and energy lines, respectively; operating levers for said valves; a vessel suspended from the operating lever of said energy valve and positioned to receive water discharged on opening of said relief valve for actuating said lever to close said valve for shutting off the energy supply; and a second vessel suspended from the operating lever of said water feed valve and concentric with said first vessel for receiving the overflow therefrom to actuate said lever for closing said water feed valve to shut off the water supply to said heater.

13. In a water heating system; a heater; a feed water line, a heating energy line and a discharge line, all connected to said heater; metering means in said feed water line for registering the energy consumed in heating the water supplied to said heater; a normally closed relief valve for said heater controlling said discharge line to discharge water from said heater under emergency conditions; control means in said energy line; means responsive to the discharge of water from said heater through said discharge line for operating said energy control means to shut off the supply of energy; and means associated with said metering means and said energy control means operable on actuation of the latter, in response to the discharge of water from said heater, for discontinuing the operation of said metering means.

CHARLES S. HAZARD.
WILLIAM H. McGARRY.